US012562175B2

(12) United States Patent
Mosayyebpour Kaskari et al.

(10) Patent No.: US 12,562,175 B2
(45) Date of Patent: Feb. 24, 2026

(54) MULTI-CHANNEL NOISE REDUCTION FOR HEADPHONES

(71) Applicant: Synaptics Incorporated, San Jose, CA (US)

(72) Inventors: Saeed Mosayyebpour Kaskari, Irvine, CA (US); Alireza Masnadi-Shirazi, Irvine, CA (US)

(73) Assignee: Synaptics Incorporated, San Jose, CA (US)

( * ) Notice: Subject to any disclaimer, the term of this patent is extended or adjusted under 35 U.S.C. 154(b) by 207 days.

(21) Appl. No.: 18/486,621

(22) Filed: Oct. 13, 2023

(65) Prior Publication Data

US 2025/0124939 A1 Apr. 17, 2025

(51) Int. Cl.
*G10L 21/0216* (2013.01)
*G10K 11/178* (2006.01)

(52) U.S. Cl.
CPC .... *G10L 21/0216* (2013.01); *G10K 11/17881* (2018.01); *G10L 2021/02166* (2013.01)

(58) Field of Classification Search
CPC ............ G10L 21/0216; G10L 21/0208; G10L 21/0232; G10L 2021/02166; G10L 2021/02165; G10K 11/17881; H04R 1/1083; H04R 3/005; H04R 1/1075; H04R 1/406; H04R 1/1091; H04R 2420/01; H04R 2460/01; H04R 2460/13
See application file for complete search history.

(56) References Cited

U.S. PATENT DOCUMENTS

| | | | |
|---|---|---|---|
| 10,841,693 B1 | 11/2020 | Ganeshkumar et al. | |
| 2014/0056435 A1* | 2/2014 | Kjems | G10L 15/20 381/317 |
| 2016/0295322 A1 | 10/2016 | Orescanin | |

(Continued)

FOREIGN PATENT DOCUMENTS

| | | |
|---|---|---|
| CN | 113257270 A | 8/2021 |
| EP | 3422736 A1 | 1/2019 |
| EP | 4138418 A1 | 2/2023 |

OTHER PUBLICATIONS

EP Extended Search Report from EP Application No. 24206072.1-1207, dated Mar. 10, 2025.

*Primary Examiner* — Yogeshkumar Patel
(74) *Attorney, Agent, or Firm* — Paradice & Li LLP

(57) ABSTRACT

This disclosure provides methods, devices, and systems for audio signal processing. The present implementations more specifically relate to speech enhancement techniques that can adapt to varying signal-to-noise ratio (SNR) conditions. In some aspects, a speech enhancement system may include a low SNR detector and a spatial filter. The spatial filter receives a multi-channel audio signal via a microphone array and produces an enhanced audio signal based on a beamforming filter. The low SNR detector tracks an SNR of a reference audio signal of the multi-channel audio signal. In some implementations, the spatial filter may substitute at least part of the reference audio signal for an auxiliary audio signal, received from an auxiliary microphone separate from the microphone array, when the SNR falls below a wideband SNR threshold. In some other implementations, the spatial filter may refrain from updating the beamforming filter when the SNR falls below a narrowband SNR threshold.

18 Claims, 9 Drawing Sheets

(56) References Cited

U.S. PATENT DOCUMENTS

| | | | | |
|---|---|---|---|---|
| 2022/0189497 | A1* | 6/2022 | Rui | H04R 1/1083 |
| 2022/0240026 | A1* | 7/2022 | Zahedi | H04R 25/405 |
| 2023/0186934 | A1* | 6/2023 | De Haan | G10L 21/0216<br>381/94.1 |
| 2023/0353952 | A1* | 11/2023 | Pedersen | H04R 25/353 |

* cited by examiner

MULTI-CHANNEL NOISE REDUCTION FOR HEADPHONES

TECHNICAL FIELD

The present implementations relate generally to signal processing, and specifically to multi-channel noise reduction techniques for headphones.

BACKGROUND OF RELATED ART

Many hands-free communication devices include microphones configured to convert sound waves into audio signals that can be transmitted, over a communications channel, to a receiving device. The audio signals often include a speech component (such as from a user of the communication device) and a noise component (such as from a reverberant enclosure). Speech enhancement is a signal processing technique that attempts to suppress the noise component of the received audio signals without distorting the speech component. Many existing speech enhancement techniques rely on statistical signal processing algorithms that continuously track the pattern of noise in each frame of the audio signal to model a spectral suppression gain or filter that can be applied to the received audio signal in a time-frequency domain.

Beamforming is a signal processing technique that can focus the energy of audio signals in a particular spatial direction. More specifically, a beamformer can improve the quality of speech in audio signals received via a microphone array through signal combining at the microphone outputs. For example, the beamformer may apply a respective weight to the audio signal output by each microphone in the array so that the signal strength is enhanced in the direction of speech (or suppressed in the direction of noise) when the audio signals combine. Adaptive beamformers are capable of dynamically adjusting the weights applied to the microphone outputs to optimize the quality, or signal-to-noise ratio (SNR), of the combined audio signal. Example adaptive beamforming techniques include minimum mean square error (MMSE), minimum variance distortionless response (MVDR), generalized eigenvalue (GEV), and generalized sidelobe cancelation (GSC), among other examples.

In low-SNR environments, adaptive beamformers may converge in a direction different than the direction of speech (such as a direction of a dominant noise source). As a result, adaptive beamformers may distort or even suppress the speech component of audio signals having low SNR. Thus, there is a need to prevent an adaptive beamformer from converging in the wrong direction under low-SNR conditions.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

One innovative aspect of the subject matter of this disclosure can be implemented in a method of speech enhancement. The method includes receiving a plurality of audio signals via a plurality of microphones, respectively, of a microphone array, where each of the plurality of audio signals represents a respective channel of a multi-channel audio signal; receiving an auxiliary audio signal via an auxiliary microphone separate from the microphone array; detecting a wideband signal-to-noise ratio (SNR) of a reference audio signal of the plurality of audio signals; selectively substituting at least part of the reference audio signal for the auxiliary audio signal based on the wideband SNR so that the multi-channel audio signal includes the auxiliary audio signal, in lieu of the at least part of the reference audio signal, as a result of the substitution; and enhancing a speech component of the multi-channel audio signal based on a minimum variance distortionless response (MVDR) beamforming filter.

Another innovative aspect of the subject matter of this disclosure can be implemented in a speech enhancement system, including a processing system and a memory. The memory stores instructions that, when executed by the processing system, cause the speech enhancement system to receive a plurality of audio signals via a plurality of microphones, respectively, of a microphone array, where each of the plurality of audio signals represents a respective channel of a multi-channel audio signal; receive an auxiliary audio signal via an auxiliary microphone separate from the microphone array; detect a wideband SNR of a reference audio signal of the plurality of audio signals; selectively substitute at least part of the reference audio signal for the auxiliary audio signal based on the wideband SNR so that the multi-channel audio signal includes the auxiliary audio signal, in lieu of the at least part of the reference audio signal, as a result of the substitution; and enhance a speech component of the multi-channel audio signal based on an MVDR beamforming filter.

BRIEF DESCRIPTION OF THE DRAWINGS

The present implementations are illustrated by way of example and are not intended to be limited by the figures of the accompanying drawings.

DETAILED DESCRIPTION

Figure 1:
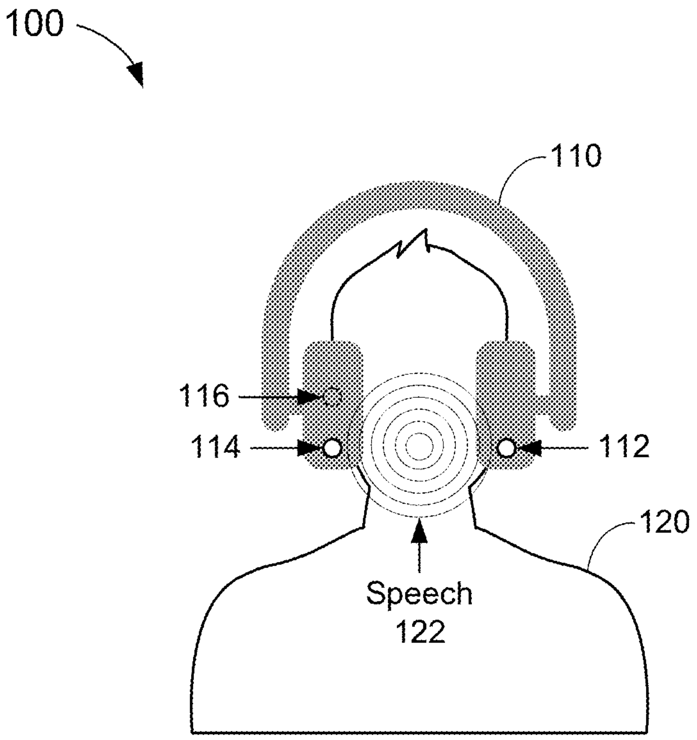
FIG. 1 shows an example environment for which speech enhancement may be implemented.

In the following description, numerous specific details are set forth such as examples of specific components, circuits, and processes to provide a thorough understanding of the present disclosure. The term "coupled" as used herein means connected directly to or connected through one or more intervening components or circuits. The terms "electronic system" and "electronic device" may be used interchangeably to refer to any system capable of electronically processing information. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory.

These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example input devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium including instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random-access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors (or a processing system). The term "processor," as used herein may refer to any general-purpose processor, special-purpose processor, conventional processor, controller, microcontroller, and/or state machine capable of executing scripts or instructions of one or more software programs stored in memory.

As described above, beamforming is a signal processing technique that can focus the energy of audio signals received via a microphone array (also referred to as a "multi-channel audio signal") in a particular spatial direction. For example, an adaptive minimum variance distortionless response (MVDR) beamformer may determine a set of weights (also referred to as an MVDR beamforming filter) that reduces or minimizes the noise component of a multi-channel audio signal without distorting the speech component. More specifically, the MVDR beamforming filter coefficients can be determined as a function of the covariance of the noise component of the multi-channel audio signal and a set of relative transfer functions (RTFs) between the microphones of the microphone array (also referred to as an "RTF vector"). However, when the signal-to-noise ratio (SNR) of the audio signal is low, an adaptive MVDR beamformer may converge in a direction different than the direction of speech (such as a direction of a dominant noise source), which may result in even greater speech distortion.

Aspects of the present disclosure recognize that, for some audio receivers, the positioning of the microphone array may be relatively fixed in relation to a target audio source. For example, headset-mounted microphones may detect speech from substantially the same direction when the headset is worn by any user (or "speaker"). As such, the RTF vector associated with a headset-mounted microphone array should exhibit very little (if any) variation over time. Aspects of the present disclosure also recognize that many headsets have auxiliary microphones that are better isolated from noise compared to the microphones of a microphone array. Example auxiliary microphones may include bone conduction microphones (which detect speech based on vibrations in the user's skull) and internal microphones (which may be located in the earcup of a headset and often used to provide feedback for active noise cancellation (ANC) systems), among other examples. Thus, the audio signals received via an auxiliary microphone may be used to supplement the audio signals received via a microphone array under low-SNR conditions.

Various aspects relate generally to audio signal processing, and more particularly, to speech enhancement techniques that can adapt to varying SNR conditions. In some aspects, a speech enhancement system may include a low SNR detector and a spatial filter. The spatial filter is configured to receive a multi-channel audio signal via a microphone array and produce an enhanced audio signal based on an MVDR beamforming filter. In some implementations, the spatial filter may determine the MVDR beamforming filter based, at least in part, on a vector of RTFs associated with the microphone array. The low SNR detector is configured to track an SNR of a reference audio signal of the multi-channel audio signal. In some implementations, the spatial filter may substitute at least part of the reference audio signal for an auxiliary audio signal when the SNR falls below a wideband SNR threshold, where the auxiliary audio signal is received via an auxiliary microphone (such as a bone conduction microphone or an internal microphone) separate from the microphone array. In some other implementations, the spatial filter may refrain from updating the RTF vector when the SNR falls below a narrowband SNR threshold.

Particular implementations of the subject matter described in this disclosure can be implemented to realize one or more of the following potential advantages. By substituting at least part of the reference audio signal for the auxiliary audio signal, aspects of the present disclosure may improve the quality of speech in a multi-channel audio signal through MVDR beamforming even in low SNR conditions. For example, because the auxiliary microphone is better isolated from noise than the microphones of the microphone array, the auxiliary audio signal may have a significantly higher SNR than the reference audio signal. Thus, replacing the reference audio signal with the auxiliary audio signal may improve the SNR of the multi-channel audio signal. By refraining from updating the RTF vector under low SNR conditions, aspects of the present disclosure may prevent the MVDR beamforming filter from converging in a wrong direction. For example, the MVDR beamforming filter may be locked to a predetermined RTF vector that is known to result in a relatively accurate beam direction. As such, the MVDR beamforming filter cannot adapt to a direction of a dominant noise source.

FIG. 1 shows an example environment 100 for which speech enhancement may be implemented. The example environment 100 includes a headset 110 and a user 120. In some aspects, the headset 110 may include an array of microphones 112 and 114. In the example of FIG. 1, the microphone array is shown to include only two microphones 112 and 114. However, in actual implementations, the microphone array may include more microphones than those depicted in FIG. 1.

The microphones 112 and 114 are positioned or otherwise configured to detect speech 122 (depicted as a series of acoustic waves) propagating from the mouth of the user 120. For example, each of the microphones 112 and 114 may convert the detected speech 122 to an electrical signal (also referred to as an "audio signal") representative of the acoustic waveform. Each audio signal may include a speech component (representing the user speech 122) and a noise component (representing background noise from the headset 110 or the surrounding environment). Due to the spatial positioning of the microphones 112 and 114, the speech 122 detected by some of the microphones in the microphone array may be delayed relative to the speech 122 detected by some other microphones in the microphone array. In other words, the microphones 112 and 114 may produce audio signals with different phase offsets.

In some aspects, the audio signals produced by each of the microphones 112 and 114 of the microphone array may be weighted and combined to enhance the speech component of the audio signals or suppress the noise component. More specifically, the weights applied to the audio signals may be configured to improve the signal strength in a direction of the speech 122. Such signal processing techniques are generally referred to as "beamforming." In some implementations, an adaptive beamformer may estimate (or predict) a set of weights to be applied to the audio signals (also referred to as a "beamforming filter") that enhances the signal strength in the direction of speech. The quality of speech in the resulting signal depends on the accuracy of the beamforming filter coefficients. For example, the speech may be enhanced when the beamforming filter is aligned with a direction of the user's mouth. On the other hand, the speech may be distorted or suppressed if the beamforming filter is aligned with a direction of a noise source.

Adaptive beamformers can dynamically adjust the beamforming filter coefficients to optimize the quality, or the signal-to-noise ratio (SNR), of the combined audio signal. For example, a minimum variance distortionless response (MVDR) beamformer may determine a beamforming filter that reduces or minimizes the noise component of the audio signals without distorting the speech component. MVDR beamforming assumes that delay-only propagation paths are present between the microphones 112 and 114 of the microphone array and the sources of audio. However, in headset-mounted configurations, the audio signals produced by the microphones 112 and 114 may include acoustic background noise from a reverberant enclosure or housing of the headset 110. When the SNR of the audio signals is too low, the phase information of the speech component may be corrupted by the dominant noise source. As a result, the MVDR beamforming filter may converge in a direction other than the direction of speech (such as a direction of the dominant noise source), which can lead to significant speech distortion or cancellation.

In some implementations, the headset 110 may further include an auxiliary microphone 116 that is separate from the microphone array. More specifically, the auxiliary microphone 116 may be better isolated from noise than any of the microphones 112 or 114 of the microphone array. For example, as shown in FIG. 1, the microphones 112 and 114 of the microphone array are disposed on an outer surface of the housing of the headset 110 whereas the auxiliary microphone 116 is disposed on an inner surface of the housing that is closer to the user 120 than the outer surface. Example suitable auxiliary microphones may include bone conduction microphones (which detect speech based on vibrations in the user's skull) and internal microphones (which may be located in the earcup of the headset 110 and used to provide feedback for active noise cancellation (ANC) systems), among other examples. In the example of FIG. 1, the headset 110 is shown to include a single auxiliary microphone 116. However, in actual implementations, the headset 110 may include any number of auxiliary microphones.

The auxiliary microphone 116 may not be able to detect as wide a range of audio frequencies as the microphones 112 and 114 of the microphone array. For example, bone conduction microphones may be suitable for detecting audio frequencies below 800 Hz whereas internal microphones may be suitable for detecting audio frequencies in the range of 800 Hz to 2.5 KHz. However, due to the positioning of the auxiliary microphone 116 (such as in the earcup) or the technology used by the auxiliary microphone 116 to detect speech (such as accelerometers), the audio signals received via the auxiliary microphone 116 (also referred to as "auxiliary audio signals") may have a higher SNR than the audio signals received via the microphones 112 and 114 of the microphone array. Thus, in some aspects, the headset 110 may supplement or replace one or more audio signals received via the microphone array with one or more auxiliary audio signals, respectively, for purposes of beamforming in low-SNR environments (such as when the SNR of the audio signals received via the microphone array is below a threshold level).

Figure 2:
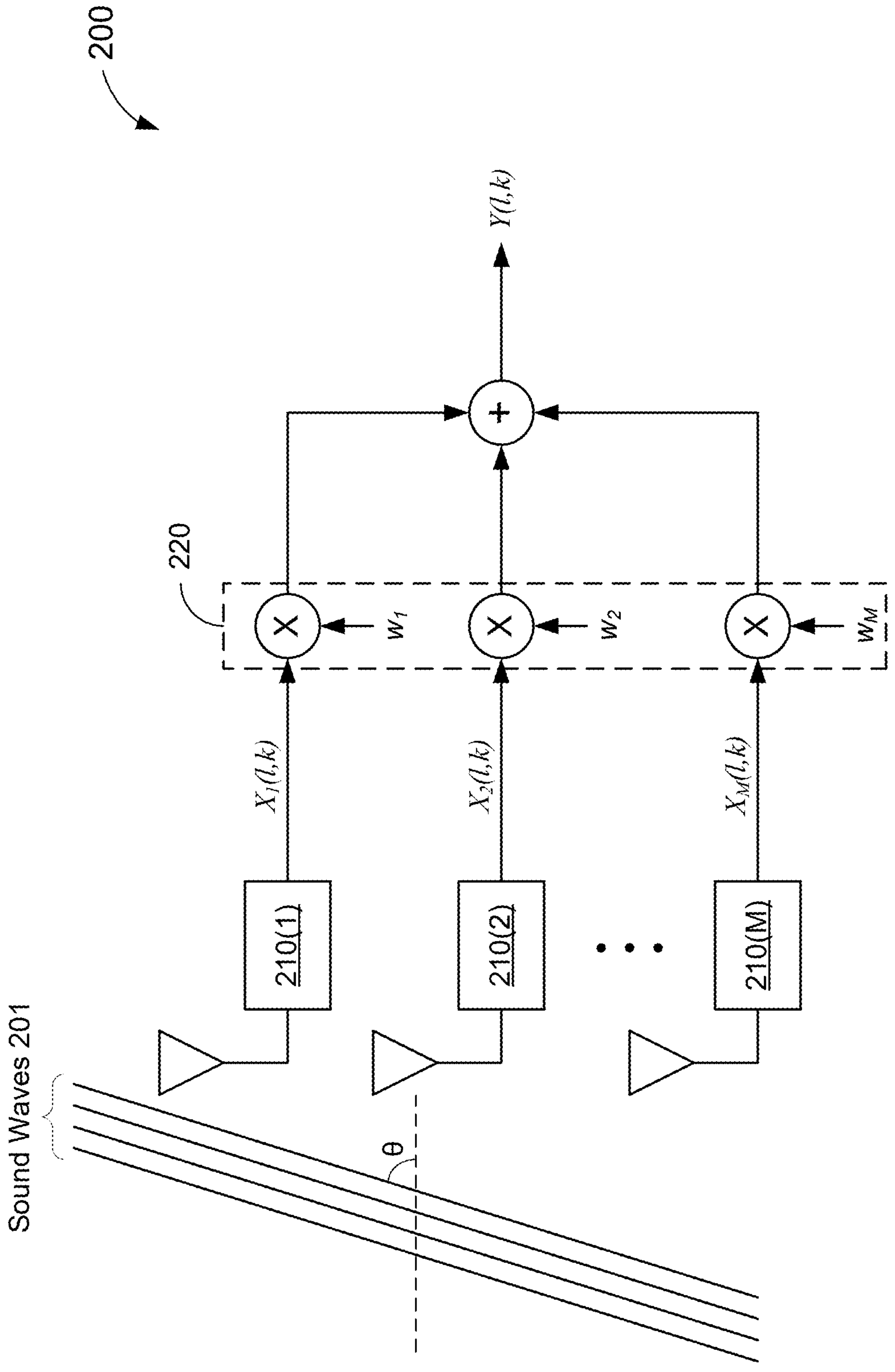
FIG. 2 shows an example audio receiver that supports multi-channel beamforming.

FIG. 2 shows an example audio receiver 200 that supports multi-channel beamforming. The audio receiver 200 includes a number (M) of microphones 210(1)-210(M), arranged in a microphone array, and a beamforming filter 220. In some implementations, the audio receiver 200 may be one example of the headset 110 of FIG. 1. With reference for example to FIG. 1, each of the microphones 210(1)-210(M) may be one example of any of the microphones 112 or 114.

The microphones 210(1)-210(M) are configured to convert a series of sound waves 201 (also referred to as "acoustic waves") into audio signals $X_1(l,k)$-$X_M(l,k)$, respectively, where l is a frame index and k is a frequency index associated with a time-frequency domain. As shown in FIG. 2, the sound waves 201 are incident upon the microphones 210(1)-210(M) at an angle (θ). The angle θ also may be referred to as the "direction-of-arrival" (DOA) of the audio signals $X_1(l,k)$-$X_M(l,k)$. In some implementations, the sound waves 201 may include user speech (such as the user speech 122 of FIG. 1) mixed with noise or interference (such as from a reverberant enclosure). The target speech and distractor speech represent a speech component (S(l,k)) and a noise component (N(l,k)), respectively, in each of the audio signals $X_1(l,k)$-$X_M(l,k)$.

Due to the spatial positioning of the microphones 210(1)-210(M), each of the audio signals $X_1(l,k)$-$X_M(l,k)$ may represent a delayed version of the same audio signal. For example, using the first audio signal $X_1(l,k)$ as a reference audio signal, each of the remaining audio signals $X_2(l,k)$-$X_M(l,k)$ can be described as a phase-delayed version of the first audio signal $X_1(l,k)$. Accordingly, the audio signals $X_1(l,k)$-$X_M(l,k)$ can be modeled as a vector (X(l,k)):

$$X(l,k) = a(\theta,k)S(l,k) + N(l,k) \tag{1}$$

where $X(l,k)=[X_1(l,k), \ldots, X_M(l,k)]^T$ is a multi-channel audio signal and $\alpha(\theta,k)$ is a steering vector which represents the set of phase-delays for the sound wave 201 incident upon the microphones 210(1)-210(M).

The beamforming filter 220 applies a vector of weights $w(l,k)=[w_1(l,k), \ldots, w_M(l,k)]^T$ (where $w_1$-$w_M$ are referred to as filter coefficients) to the audio signal X(l,k) to produce an enhanced audio signal (Y(l,k)):

$$Y(l,k) = w^H(l,k)X(l,k) = w^H(l,k)a(\theta,k)S(l,k) + w^H(l,k)N(l,k) \tag{2}$$

The vector of weights w(l,k) determines the direction of a "beam" associated with the beamforming filter 220. Thus, the filter coefficients $w_1$-$w_M$ can be adjusted to "steer" the beam in various directions.

In some aspects, an adaptive beamformer (not shown for simplicity) may determine a vector of weights w(l,k) that optimizes the enhanced audio signal Y(l,k) with respect to one or more conditions. For example, an MVDR beamformer is configured to determine a vector of weights w(l,k) that reduces or minimizes the variance of the noise component of the enhanced audio signal Y(l,k) without distorting the speech component of the enhanced audio signal Y(l,k). In other words, the vector of weights w(l,k) may satisfy the following condition:

$$\operatorname{argmin}_w w^H(l,k)\Phi_{NN}(l,k)w(l,k) \text{ s.t. } w^H(l,k)a(\theta,k) = 1$$

where $\Phi_{NN}(l,k)$ is the covariance of the noise component N(l,k) of the received audio signal X(l,k). The resulting vector of weights w(l,k) is an MVDR beamforming filter ($w_{MVDR}(k)$), which can be expressed as:

$$W_{MVDR}(l,k) = \frac{\Phi_{NN}^{-1}(l,k)a(\theta,k)}{a^H(\theta,k)\Phi_{NN}^{-1}(l,k)a(\theta,k)} \tag{3}$$

As shown in Equation 3, some MVDR beamformers may rely on geometry (such as the steering vector a(θ,k)) to determine the vector of weights w(l,k). As such, the accuracy of the MVDR beamforming filter $w_{MVDR}(l,k)$ depends on the accuracy of the steering vector a(θ,k) estimation, which may be difficult to adapt to different users. Aspects of the present disclosure recognize that the MVDR beamforming filter $w_{MVDR}(l,k)$ can be further expressed as a function of the covariance ($\Phi_{SS}(l,k)$) of the speech component S(l,k) of the received audio signal X(l,k):

$$W_{MVDR}(l,k) = \frac{W(l,k)}{W_{norm}(l,k)}u(l,k) \tag{4}$$

$$W(l,k) = \Phi_{NN}^{-1}(l,k)\Phi_{SS}(l,k)$$

where u(l,k) is the one-hot vector representing a reference microphone channel and $w_{norm}(l,k)$ is a normalization factor associated with W(l,k). Example suitable normalization factors include, among other examples, $w_{norm}(l,k)=\max(|W(l,k)|)$ and $w_{norm}(l,k)=\operatorname{trace}(W(l,k))$.

Aspects of the present disclosure also recognize that the steering vector a(θ,k) can be expressed as a vector of the relative transfer functions (RTFs) between each of the microphones 210(1)-210(M) and a reference microphone within the microphone array (such as the microphone 210(1)). Moreover, the RTF vector ($\hat{a}(l,k)$) associated with the target speech can be estimated based on the speech covariance $\Phi_{SS}(l,k)$:

$$\hat{a}(l,k) \approx \frac{d(l,k)}{d_1(l,k)} \tag{5}$$

$$d(l,k) = [d_1(l,k), \ldots, d_M(l,k)] = \Phi_{SS}(l,k)w_{MVDR}(l,k)$$

Substituting the RTF vector $\hat{a}(l,k)$ into Equation 3 yields:

$$W_{MVDR}(l,k) = a(l,k)\frac{\Phi_{NN}^{-1}(l,k)\hat{a}(l,k)}{\hat{a}^H(l,k)\Phi_{NN}^{-1}(l,k)\hat{a}(l,k)} \tag{6}$$

-continued $$a(l,k)=\sqrt{\frac{\hat{a}^H(l,k)\hat{a}(l,k)}{M}}$$

In some aspects, the noise covariance $\Phi_{NN}(l,k)$ and the speech covariance $\Phi_{SS}(l,k)$ may be estimated or updated over time through supervised learning. For example, the speech covariance $\Phi_{SS}(l,k)$ can be estimated when speech is present in the received audio signal X(l,k) and the noise covariance $\Phi_{NN}(l,k)$ can be estimated when speech is absent from the received audio signal X(l,k). In some implementations, a deep neural network (DNN) may be used to determine whether speech is present or absent in the audio signal X(l,k). For example, the DNN may be trained to infer a likelihood or probability of speech in each frame of the audio signal X(l,k). More specifically, the DNN may be used as, or within, a voice activity detector (VAD). However, when the SNR of the audio signal X(l,k) is too low (such as below a threshold level), the phase information of the user speech may be corrupted by the dominant noise source. As a result, existing adaptive beamformers may converge in a direction different than the direction of speech, which can lead to speech distortion or cancellation in the enhanced audio signal Y(l,k).

Figure 3:
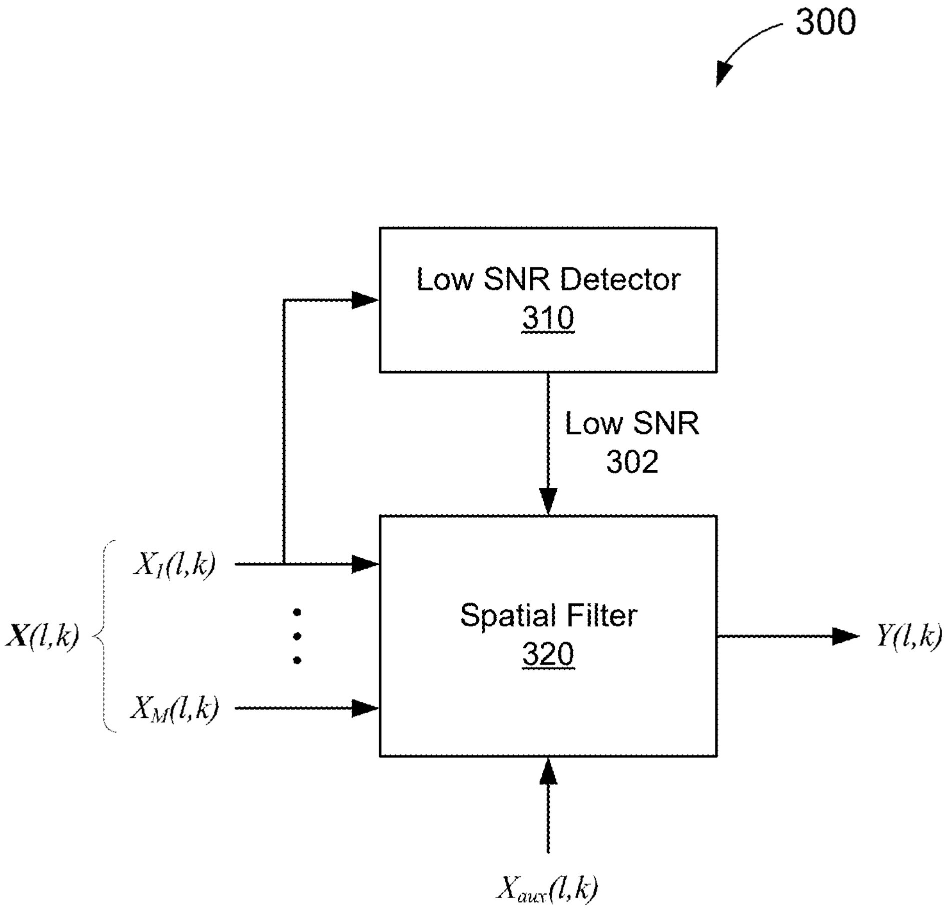
FIG. 3 shows a block diagram of an example speech enhancement system, according to some implementations.

FIG. 3 shows a block diagram of an example speech enhancement system 300, according to some implementations. The speech enhancement system 300 is configured to produce an enhanced audio signal Y(l,k) based, at least in part, on a multi-channel audio signal X(l,k) received via a microphone array. In some implementations, the microphone array may be one example of the microphones 112 and 114 of FIG. 1 or the microphones 210(1)-210(M) of FIG. 2. As shown in FIG. 3, the multi-channel audio signal X(l,k) includes a number (M) of component audio signals $X_1(l,k)$-$X_M(l,k)$ each representing a respective channel of the multi-channel audio signal X(l,k).

The speech enhancement system 300 includes a low SNR detector 310 and a spatial filter 320. The low SNR detector 310 is configured to detect one or more low SNR conditions based on a reference audio signal ($X_1(l,k)$) of the multi-channel audio signal X(l,k). The reference audio signal $X_1(l,k)$ represents the audio signal received via a reference microphone of the microphone array. As described with reference to FIG. 2, the reference microphone may be any microphone of the microphone array that is used as a reference for calculating each RTF of the RTF vector $\hat{a}(l,k)$. In some aspects, the low SNR detector 310 may track the SNR based on a noise floor of the reference audio signal $X_1(l,k)$ and may compare the SNR with one or more threshold SNR levels. More specifically, the low SNR detector 310 may indicate whether the SNR of the reference audio signal $X_1(l,k)$ is below the one or more threshold SNR levels (as represented by a "low SNR" signal 302).

In some implementations, the low SNR detector 310 may track a wideband SNR of the reference audio signal $X_1(l,k)$. As used herein, the term "wideband SNR" refers to the total SNR of the reference audio signal $X_1(l,k)$, measured across all frequency bins k. Thus, the low SNR detector 310 may estimate a single wideband SNR value ($SNR_{wb}(l)$) per frame l of the reference audio signal $X_1(l,k)$, and the low SNR signal 302 may indicate whether each value of $SNR_{wb}(l)$ is below a wideband SNR threshold. In some other implementations, the low SNR detector 310 may track a narrowband SNR of the reference audio signal $X_1(l,k)$. As used herein, the term "narrowband SNR" refers to a respective SNR of the reference audio signal $X_1(l,k)$ measured at each frequency bin k. Thus, the low SNR detector 310 may estimate a number (K) of narrowband SNR values ($SNR_{nb}(l,k)$) per frame l of the reference audio signal $X_1(l,k)$, where $k\in[1, K]$, and the low SNR signal 302 may indicate whether each value of $SNR_{nb}(l,k)$ is below a narrowband SNR threshold.

The spatial filter 320 is configured to apply a vector of weights w(l,k) to the audio signal X(l,k) to produce the enhanced audio signal Y(l,k) (such as according to Equation 2). In some implementations, the spatial filter 320 may be an adaptive beamformer that determines the vector of weights w(l,k) to apply to each frame l of the audio signal X(l,k) based, at least in part, on a probability of speech (p(l,k)) associated with the respective audio frame. For example, the probability of speech p(l,k) may be inferred by a DNN trained to detect speech in audio signals. As shown in Equations 4-6, an MVDR beamforming filter $w_{MVDR}(l,k)$ can be determined based on the covariance of noise $\Phi_{NN}(l,k)$ and the covariance of speech $\Phi_{SS}(l,k)$ in the audio signal X(l,k). In some aspects, the spatial filter 320 may dynamically update the speech covariance $\Phi_{SS}(l,k)$ and the noise covariance $\Phi_{NN}(l,k)$ based on the probability of speech p(l,k) associated with the respective audio frame.

As described with reference to FIGS. 1 and 2, the spatial filter 320 may not be able to accurately estimate the speech covariance $\Phi_{SS}(l,k)$ when the SNR of the audio signal X(l,k) is too low. Incorrect estimates of the speech covariance $\Phi_{SS}(l,k)$ can cause the beamforming filter $w_{MVDR}(l,k)$ to converge in a wrong direction (such as towards a dominant noise source), which can lead to speech distortion or cancellation in the enhanced audio signal Y(l,k). In some aspects, the spatial filter 320 may refrain from updating the beamforming filter $w_{MVDR}(l,k)$ when the low SNR signal 302 indicates that an SNR of the reference audio signal $X_1(l,k)$ is below a threshold SNR level. For example, the spatial filter 320 may lock the filter coefficients of the beamforming filter $w_{MVDR}(l,k)$ to a beam direction known to result in relatively accurate or stable speech enhancement. As a result, the beamforming filter $w_{MVDR}(l,k)$ cannot converge in a direction of a dominant noise source.

In some other aspects, the spatial filter 320 may compensate for the reference audio signal $X_1(l,k)$ having a low SNR by substituting or replacing at least part of the reference audio signal $X_1(l,k)$ with an auxiliary audio signal ($X_{aux}(l,k)$) received via an auxiliary microphone (not shown for simplicity). For example, the spatial filter 320 may modify the multi-channel audio signal X(l,k) to include the auxiliary audio signal $X_{aux}(l,k)$, in lieu of at least part of the reference audio signal $X_1(l,k)$, when the low SNR signal 302 indicates that an SNR of the reference audio signal $X_1(l,k)$ is below a threshold SNR level. In some implementations, the auxiliary microphone may be one example of the auxiliary microphone 116 of FIG. 1 (such as a bone conduction microphone or an internal microphone). Because the auxiliary microphone is better isolated from noise than any of the microphones of the microphone array, substituting at least part of the reference audio signal $X_1(l,k)$ for the auxiliary audio signal $X_{aux}(l,k)$ may improve the quality of speech in the enhanced audio signal Y(l,k) when the SNR of the reference audio signal $X_1(l,k)$ is low.

Figure 4:
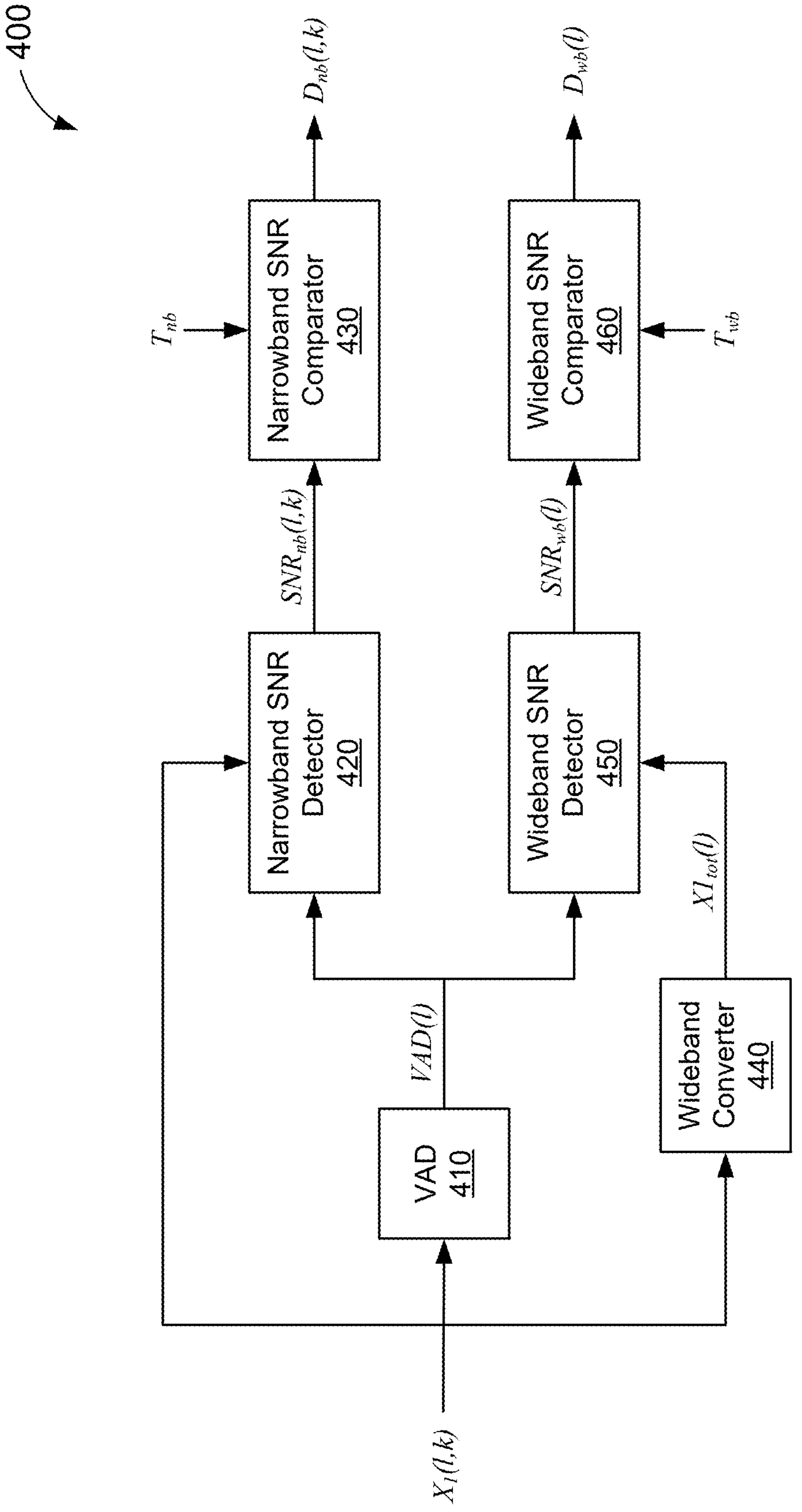
FIG. 4 shows a block diagram of an example low signal-to-noise ratio (SNR) detection system, according to some implementations.

FIG. 4 shows a block diagram of an example low SNR detection system 400, according to some implementations. The low SNR detection system 400 is configured to track a narrowband SNR ($SNR_{nb}(l,k)$) and a wideband SNR ($SNR_{wb}(l)$) of an audio signal ($X_1(l,k)$) and produce low SNR detection flags ($D_{nb}(l,k)$ and $D_{wb}(l)$) indicating whether $SNR_{nb}(l,k)$ and $SNR_{wb}(l)$ are below respective threshold SNR levels. In some implementations, the low SNR detection system 400 may be one example of the low SNR detector 310 of FIG. 3. With reference for example to FIG. 3, the audio signal $X_1(l,k)$ may be a reference audio signal of the multi-channel audio signal X(l,k) and the low SNR detection flags $D_{nb}(l,k)$ and $D_{wb}(l)$ may be included in, or otherwise indicated by, the low SNR signal 302.

The low SNR detection system 400 includes a VAD 410, a narrowband SNR detector 420, a narrowband SNR comparator 430, a wideband converter 440, a wideband SNR detector 450, and a wideband SNR comparator 460. The VAD 410 is configured to determine or predict whether speech is present (or absent) in the audio signal $X_1(l,k)$. More specifically, the VAD 410 produces a VAD parameter (VAD(l)) indicating whether speech is present or absent in the current frame l of the audio signal $X_1(l,k)$. In some implementations, the VAD 410 may include a DNN that is trained to infer a probability of speech ($p_{DNN}(l,k)$) in the audio signal $X_1(l,k)$, and the VAD 410 may generate the VAD parameter VAD(l) based on the probability of speech $p_{DNN}(l,k)$. For example, the VAD 410 may determine that speech is present in the audio signal $X_1(l,k)$ (VAD(l)=1) if the probability of speech $p_{DNN}(l,k)$, averaged across all frequency bins k, is greater than a threshold probability.

In some other implementations, the VAD 410 may generate the VAD parameter VAD(l) based on the energy detected in an auxiliary audio signal (such as the auxiliary audio signal $X_{aux}(l,k)$ of FIG. 3) received via an auxiliary microphone (such as the auxiliary microphone 116 of FIG. 1). As described with reference to FIG. 1, some auxiliary microphones (such as bone conduction microphones) are configured to only capture the energy of user speech. In other words, background noise may not be present or otherwise reflected in the auxiliary audio signals. Thus, aspects of the present disclosure recognize that the energy in the auxiliary audio signal may directly indicate a presence or absence of speech. For example, the VAD 410 may determine that speech is present in the audio signal $X_1(l,k)$ (VAD(l)=1) if the energy of the auxiliary audio signal is greater than a threshold energy level.

The narrowband SNR detector 420 is configured to estimate $SNR_{nb}(l,k)$ based on the audio signal $X_1(l,k)$ and the VAD parameter VAD(l). In some implementations, the narrowband SNR detector 420 may track the noise floor of the audio signal $X_1(l,k)$ as well as the narrowband speech energy in the audio signal $X_1(l,k)$ based, at least in part, on the VAD parameter VAD(l). For example, the narrowband SNR detector 420 may estimate or update the noise floor of the audio signal $X_1(l,k)$ when speech is absent from the audio signal $X_1(l,k)$ (such as when VAD(l)=0) and may estimate or update the narrowband speech energy when speech is present in the audio signal $X_1(l,k)$ (such as when VAD(l)=1). The narrowband SNR detector 420 may further calculate $SNR_{nb}(l,k)$ based on the noise floor of $X_1(l,k)$ and the narrowband speech energy in $X_1(l,k)$. In some implementations, the narrowband SNR detector 420 may estimate $SNR_{nb}(l,k)$ in an equivalent rectangular bandwidth (ERB) resolution.

The narrowband SNR comparator 430 compares $SNR_{nb}(l,k)$ with a narrowband SNR threshold ($T_{nb}$) to produce a narrowband low SNR detection flag $D_{nb}(l,k)$. For example, the narrowband SNR comparator 430 may detect a low SNR condition ($D_{nb}(l,k)=1$) when $SNR_{nb}(l,k)$ is less than a narrowband SNR threshold ($T_{nb}$). On the other hand, the narrowband SNR comparator 430 may not detect a low SNR condition ($D_{nb}(l,k)=0$) when $SNR_{nb}(l,k)$ is greater than or equal to the narrowband SNR threshold $T_{nb}$. In some implementations, the narrowband SNR threshold $T_{nb}$ may be different for different frequency ranges. For example, the narrowband SNR threshold $T_{nb}(k)$ may vary as a function of the frequency bin k. In such implementations, the narrowband SNR comparator 430 may compare $SNR_{nb}(l,k)$ with the narrowband SNR threshold $T_{nb}(k)$ in the logarithmic domain.

Unlike the narrowband SNR, wideband SNR represents the total SNR of the audio signal $X_1(l,k)$, measured across all frequency bins k. In other words, the low SNR detection system 400 may track only one value of $SNR_{wb}(l)$ per frame l of the audio signal $X_1(l,k)$. In some implementations, the wideband converter 440 may determine the wideband energy ($X1_{tot}(l)$) in each frame l of the audio signal $X_1(l,k)$:

$$X1_{tot}(l) = \sum_{k=K_{min}}^{K_{max}} |X_1(l, k)|$$

where $K_{min}$ and $K_{max}$ define a range of frequencies associated with speech. In some implementations, $K_{min}$ and $K_{max}$ may be configured to span a range of frequencies detectable by a bone microphone (such as 50 Hz to 80 Hz). In some other implementations, $K_{min}$ and $K_{max}$ may be configured to span a range of frequencies detectable by an internal microphone (such as 800 Hz to 1.5 kHz).

The wideband SNR detector 450 is configured to estimate $SNR_{wb}(l)$ based on the wideband energy $X1_{tot}(l)$ and the VAD parameter VAD(l). In some implementations, the wideband SNR detector 450 may track the noise floor of the wideband energy $X1_{tot}(l)$ as well as the wideband speech energy in $X1_{tot}(l)$ based, at least in part, on the VAD parameter VAD(l). For example, the wideband SNR detector 450 may estimate or update the noise floor of $X1_{tot}(l)$ when speech is absent from the audio signal $X_1(l,k)$ (such as when VAD(l)=0) and may estimate or update the wideband speech energy when speech is present in the audio signal $X_1(l,k)$ (such as when VAD(l)=1). The wideband SNR detector 450 may further calculate $SNR_{wb}(l)$ based on the noise floor of $X1_{tot}(l)$ and the wideband speech energy in $X1_{tot}(l)$.

The wideband SNR comparator 460 compares $SNR_{wb}(l)$ with a wideband SNR threshold ($T_{wb}$) to produce a wideband low SNR detection flag $D_{wb}(l)$. For example, the wideband SNR comparator 460 may detect a low SNR condition ($D_{wb}(l)=1$) when $SNR_{wb}(l)$ is less than the wideband SNR threshold $T_{wb}$. On the other hand, the wideband SNR comparator 460 may not detect a low SNR condition ($D_{wb}(l)=0$) when $SNR_{wb}(l)$ is greater than or equal to the wideband SNR threshold $T_{wb}$.

Figure 5A:
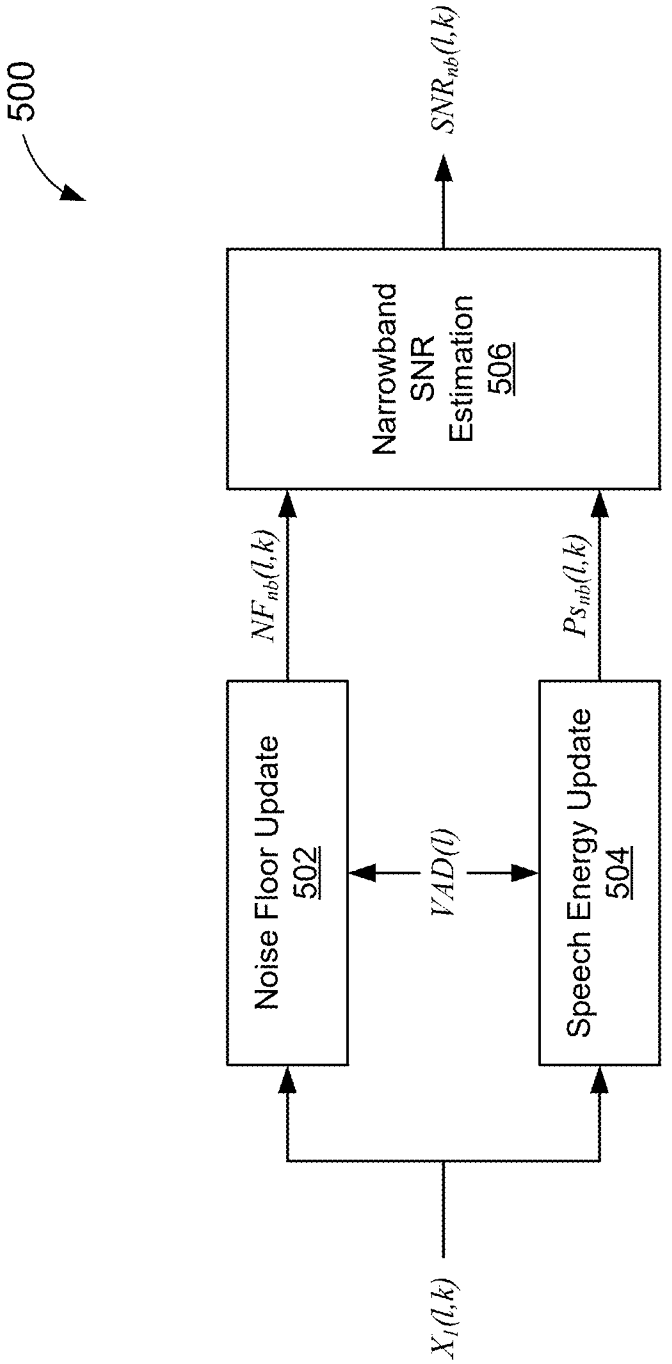
FIG. 5A shows a block diagram of an example narrowband SNR detection system, according to some implementations.

FIG. 5A shows a block diagram of an example narrowband SNR detection system 500, according to some implementations. The narrowband SNR detection system 500 is configured to determine a respective narrowband SNR value ($SNR_{nb}(l,k)$), per frequency bin k, for each frame l of an audio signal ($X_1(l,k)$). In some implementations, the narrowband SNR detection system 500 may be one example of the narrowband SNR detector 420 of FIG. 4. With reference for example to FIG. 3, the audio signal $X_1(l,k)$ may be a reference audio signal of the multi-channel audio signal X(l,k).

The narrowband SNR detection system 500 includes a noise floor update component 502, a speech energy update component 504, and a narrowband SNR estimation component 506. The noise floor update component 502 is configured to estimate a narrowband noise floor ($NF_{nb}(l,k)$) of the audio signal $X_1(l,k)$ based on a VAD parameter (VAD(l)). With reference for example to FIG. 4, the VAD parameter VAD(l) may be generated by the VAD 410. More specifically, the VAD parameter VAD(l) may indicate whether speech is present or absent in each frame l of the audio signal $X_1(l,k)$. In some implementations, the noise floor update component 502 may refrain from updating the narrowband noise floor $NF_{nb}(l,k)$ when the VAD parameter VAD(l) indicates that speech is present in the audio signal $X_1(l,k)$:

$$NF_{nb}(l,k)=NF_{nb}(l-1,k) \text{ if } VAD(l)=1$$

When the VAD parameter VAD(l) indicates that speech is absent from the audio signal $X_1(l,k)$ (such as when VAD(l)=0), the noise floor update component 502 may estimate the narrowband noise floor $NF_{nb}(l,k)$ for each frequency bin k. In some implementations, the noise floor update component 502 may apply an upward smoothing factor ($\alpha_{up}$) or a downward smoothing factor ($\alpha_{dn}$) to the narrowband noise floor update based on whether the estimated narrowband noise floor $NF_{nb}(l,k)$ is below the energy level of the audio signal $X_1(l,k)$, where $\alpha_{up}>\alpha_{dn}$.

$$NF_{nb}(l,k)=\begin{cases}\alpha_{up}NF_{nb}(l-1,k)+(1-\alpha_{up})|X_1(l,k)| & \text{if } NF_{nb}(l,k)<|X_1(l,k)| \\ \alpha_{dn}NF_{nb}(l-1,k)+(1-\alpha_{dn})|X_1(l,k)| & \text{if } NF_{nb}(l,k)\geq|X_1(l,k)|\end{cases}$$

The speech energy update component 504 is configured to estimate a narrowband speech energy ($Ps_{nb}(l,k)$) of the audio signal $X_1(l,k)$ based on the VAD parameter VAD(l). In some implementations, the speech energy update component 504 may refrain from updating the narrowband speech energy $Ps_{nb}(l,k)$ when the VAD parameter VAD(l) indicates that speech is absent from the audio signal $X_1(l,k)$:

$$Ps_{nb}(l,k)=Ps_{nb}(l-1,k) \text{ if } VAD(l)=0$$

When the VAD parameter VAD(l) indicates that speech is present in the audio signal $X_1(l,k)$ (such as when VAD(l)=1), the speech energy update component 504 may estimate the narrowband speech energy $Ps_{nb}(l,k)$ for each frequency bin k. In some implementations, the speech energy update component 504 may apply a smoothing factor ($\alpha_{ps}$) to the narrowband speech energy update:

$$Ps_{nb}(l,k)=\alpha_{ps}Ps_{nb}(l-1,k)+(1-\alpha_{ps})|X_1(l,k)|$$

The narrowband SNR estimation component 506 is configured to estimate the narrowband SNR of the audio signal $X_1(l,k)$ based on the narrowband noise floor $NF_{nb}(l,k)$ and the narrowband speech energy $Ps_{nb}(l,k)$. For example, $SNR_{nb}(l,k)$ may be estimated as:

$$SNR_{nb}(l,k)=\frac{Ps_{nb}(l,k)-NF_{nb}(l,k)}{\max(NF_{nb}(l,k),\varepsilon)}$$

where ε is a small positive number that is used to avoid division by infinity.

Figure 5B:
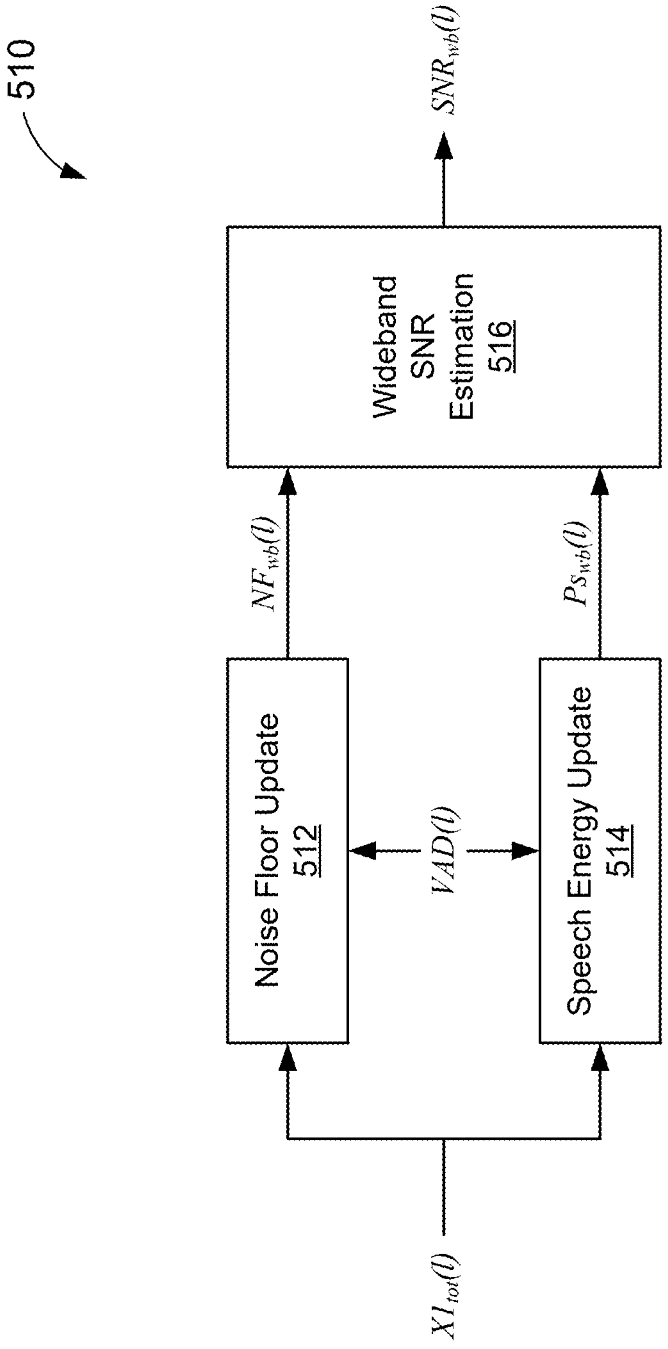
FIG. 5B shows a block diagram of an example wideband SNR detection system, according to some implementations.

FIG. 5B shows a block diagram of an example wideband SNR detection system 510, according to some implementations. The wideband SNR detection system 510 is configured to determine a wideband SNR value ($SNR_{wb}(l)$) for each frame l of an audio signal ($X_1(l,k)$). More specifically, the wideband SNR detection system 510 may determine the value of $SNR_{wb}(l)$ based on the wideband energy ($X1_{tot}(l)$) of the audio signal $X_1(l,k)$. In some implementations, the wideband SNR detection system 510 may be one example of the wideband SNR detector 450 of FIG. 4. With reference for example to FIG. 3, the audio signal $X_1(l,k)$ may be a reference audio signal of the multi-channel audio signal X(l,k).

The wideband SNR detection system 510 includes a noise floor update component 512, a speech energy update component 514, and a wideband SNR estimation component 516. The noise floor update component 512 is configured to estimate a wideband noise floor ($NF_{wb}(l)$) of the audio signal $X_1(l,k)$ based on a VAD parameter (VAD(l)). With reference for example to FIG. 4, the VAD parameter VAD(l) may be generated by the VAD 410. More specifically, the VAD parameter VAD(l) may indicate whether speech is present or absent in each frame l of the audio signal $X_1(l,k)$. In some implementations, the noise floor update component 512 may refrain from updating the wideband noise floor $NF_{wb}(l)$ when the VAD parameter VAD(l) indicates that speech is present in the audio signal $X_1(l,k)$:

$$NF_{wb}(l)=NF_{wb}(l-1) \text{ if } VAD(l)=1$$

When the VAD parameter VAD(l) indicates that speech is absent from the audio signal $X_1(l,k)$ (such as when VAD(l)=0), the noise floor update component 512 may estimate the wideband noise floor $NF_{wb}(l)$ for the current frame l of the audio signal $X_1(l,k)$. In some implementations, the noise floor update component 512 may apply an upward smoothing factor ($\alpha_{up}$) or a downward smoothing factor ($\alpha_{an}$) to the wideband noise floor update based on whether the estimated wideband noise floor $NF_{wb}(l)$ is below the wideband energy level $X1_{tot}(l)$, where $\alpha_{up}>\alpha_{dn}$.

$$NF_{wb}(l)=\begin{cases}\alpha_{up}NF_{wb}(l-1)+(1-\alpha_{up})X1_{tot}(l) & \text{if } NF_{wb}(l)<X1_{tot}(l) \\ \alpha_{dn}NF_{wb}(l-1)+(1-\alpha_{dn})X1_{tot}(l) & \text{if } NF_{wb}(l)\geq X1_{tot}(l)\end{cases}$$

The speech energy update component 514 is configured to estimate a wideband speech energy ($Ps_{wb}(l)$) of the audio signal $X_1(l,k)$ based on the VAD parameter VAD(l). In some implementations, the speech energy update component 514 may refrain from updating the wideband speech energy $Ps_{wb}(l)$ when the VAD parameter VAD(l) indicates that speech is absent from the audio signal $X_1(l,k)$:

$$Ps_{wb}(l)=Ps_{wb}(l-1) \text{ if } VAD(l)=0$$

When the VAD parameter VAD(l) indicates that speech is present in the audio signal $X_1(l,k)$ (such as when VAD(l)=1), the speech energy update component 514 may estimate the wideband speech energy $Ps_{wb}(l)$ for the current frame l of the audio signal $X_1(l,k)$. In some implementations, the speech energy update component 514 may apply a smoothing factor ($\alpha_{ps}$) to the narrowband speech energy update:

$$Ps_{wb}(l) = \alpha_{ps} Ps_{wb}(l-1) + (1-\alpha_{ps}) X1_{tot}(l)$$

The wideband SNR estimation component 516 is configured to estimate the wideband SNR of the audio signal $X_1(l,k)$ based on the wideband noise floor $NF_{wb}(l)$ and the wideband speech energy $Ps_{wb}(l)$. For example, $SNR_{wb}(l)$ may be estimated as:

$$SNR_{wb}(l) = \frac{Ps_{wb}(l) - NF_{wb}(l)}{\max(NF_{wb}(l), \varepsilon)}$$

where ε is a small positive number that is used to avoid division by infinity.

Figure 6:
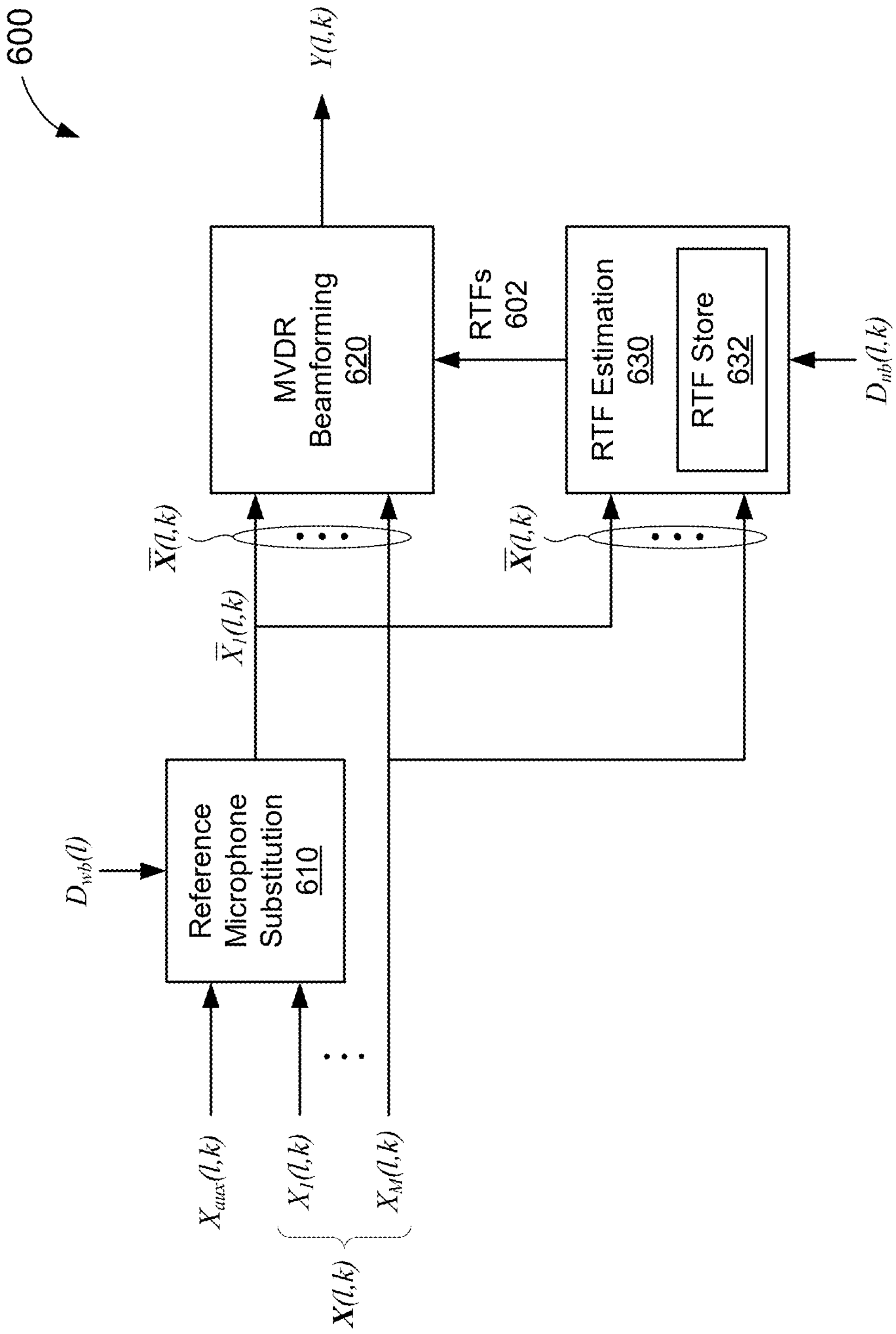
FIG. 6 shows a block diagram of an example adaptive beamforming system, according to some implementations.

FIG. 6 shows a block diagram of an example adaptive beamforming system 600, according to some implementations. The adaptive beamforming system 600 is configured to produce an enhanced audio signal (Y(l,k)) based, at least in part, on a number (M) of audio signals ($X_1(l,k)$-$X_M(l,k)$) received via a microphone array (such as the microphones 112 and 114 of FIG. 1 or the microphones 210(1)-210(M) of FIG. 2) and an auxiliary audio signal ($X_{aux}(l,k)$) received via an auxiliary microphone (such as the auxiliary microphone 116 of FIG. 1). In some implementations, the adaptive beamforming system 600 may be one example of the spatial filter 320 of FIG. 3. With reference for example to FIG. 3, each of the audio signals $X_1(l,k)$-$X_M(l,k)$ may represent a respective channel of a multi-channel audio signal X(l,k).

The adaptive beamforming system 600 includes a reference microphone substitution component 610, an MVDR beamforming component 620, and an RTF estimation component 630. The reference microphone substitution component 610 is configured to produce an SNR-adjusted reference audio signal ($\overline{X}_1(l,k)$) based on the auxiliary audio signal $X_{aux}(l,k)$ and a reference audio signal $X_1(l,k)$ of the multi-channel audio signal X(l,k). As described with reference to FIGS. 2 and 3, the reference audio signal $X_1(l,k)$ represents the audio signal received via a reference microphone of the microphone array, which may be any microphone of the microphone array that is used as a reference for calculating each RTF of the RTF vector â(l,k). The SNR-adjusted reference audio signal $\overline{X}_1(l,k)$ is combined with the remaining audio signals received from the microphone array to produce an SNR-adjusted multi-channel audio signal $\overline{X}(l,k)$, where:

$$\overline{X}(l,k) = [\overline{X}_1(l,k), \ldots X_M(l,k)] \quad (7)$$

In some aspects, the reference microphone substitution component 610 may generate the SNR-adjusted reference audio signal $\overline{X}_1(l,k)$ by selectively substituting at least part of the reference audio signal $X_1(l,k)$ for the auxiliary audio signal $X_{aux}(l,k)$ based on a wideband low SNR detection flag ($D_{wb}(l)$). As described with reference to FIGS. 3 and 4, the detection flag $D_{wb}(l)$ indicates whether a wideband SNR of the reference audio signal $X_1(l,k)$ is below a threshold wideband SNR level. With reference for example to FIG. 3, the detection flag $D_{wb}(l)$ may be included in, or otherwise indicated by, the low SNR signal 302. Aspects of the present disclosure recognize that, the auxiliary audio signal $X_{aux}(l,k)$ may have a higher SNR than the reference audio signal $X_1(l,k)$ but may span a narrower range of frequencies (such as $0 \le k \le K_{aux}$). For example, the microphones of a microphone array are generally capable of detecting higher audio frequencies (such as up to k=K) than bone conduction microphones or internal microphones ($K > K_{aux}$).

Thus, the reference microphone substitution component 610 may substitute or replace the reference audio signal $X_1(l,k)$ with the auxiliary audio signal $X_{aux}(l,k)$ only when the detection flag $D_{wb}(l)$ indicates that a low SNR condition is detected ($D_{wb}(l)=1$). In other words, the reference microphone substitution component 610 may output the reference audio signal $X_1(l,k)$ as the SNR-adjusted reference audio signal $\overline{X}_1(l,k)$ if the detection flag $D_{wb}(l)$ indicates that a low SNR condition is not detected ($D_{wb}(l)=0$):

$$\overline{X}_1(l,k) = X_1(l,k) \text{ if } D_{wb}(l) = 0$$

In some implementations, the reference microphone substitution component 610 may substitute or replace only a portion of the reference audio signal $X_1(l,k)$ with the auxiliary audio signal $X_{aux}(l,k)$ when the detection flag $D_{wb}(l)$ indicates that a low SNR condition is detected ($D_{wb}(l)=1$). For example, the reference microphone substitution component 610 may replace the reference audio signal $X_1(l,k)$ with the auxiliary audio signal $X_{aux}(l,k)$ only for the narrower range of frequencies detectable by the auxiliary microphone:

$$\overline{X}_1(l,k) = \begin{cases} X_{aux}(l,k) & \text{for } k \le K_{aux} \\ X_1(l,k) & \text{for } k > K_{aux} \end{cases}$$

In the example of FIG. 6, the reference microphone substitution component 610 is shown to receive a single auxiliary audio signal $X_{aux}(l,k)$ from a single auxiliary microphone. However, in some other implementations, the reference microphone substitution component 610 may receive multiple auxiliary audio signals from multiple auxiliary microphones, respectively (such as from a bone conduction microphone and an internal microphone). In such implementations, the reference microphone substitution component 610 may substitute the reference audio signal $X_1(l,k)$ for multiple auxiliary audio signals when a low SNR condition is detected ($D_{wb}(l)=1$). For example, the reference microphone substitution component 610 may replace the reference audio signal $X_1(l,k)$ with an auxiliary audio signal received from a bone conduction microphone for frequencies below 800 Hz and may replace the reference audio signal $X_1(l,k)$ with an auxiliary audio signal received from an internal microphone for frequencies between 800 Hz and 1.5 kHz.

The MVDR beamforming component 620 applies an MVDR beamforming filter $w_{MVDR}(l,k)$ to the SNR-adjusted multi-channel audio signal $\overline{X}(l,k)$ to produce the enhanced audio signal Y(l,k) (such as according to Equation 2). In some implementations, the MVDR beamforming component 620 may be one example of the beamforming filter 220 of FIG. 2. For example, the MVDR beamforming component 620 may determine the filter coefficients of the MVDR beamforming filter $w_{MVDR}(l,k)$ based on a covariance of noise $\Phi_{NN}(l,k)$ and a covariance of speech $\Phi_{SS}(l,k)$ in the audio signal $\overline{X}(l,k)$ (such as according to Equation 4). In some implementations, the MVDR beamforming component 620 may determine the filter coefficients for the MVDR beamforming filter $w_{MVDR}(l,k)$ based on a vector of RTFs 602 associated with the audio signal $\overline{X}(l,k)$ (such as according to Equation 6).

The RTF estimation component 630 may be configured to update the RTFs 602 to adapt the beam direction of the MVDR beamforming filter $w_{MVDR}(l,k)$ to the direction of target speech. For example, the RTF estimation component 630 may estimate an RTF vector ($\hat{a}(l,k)$) based, at least in part, on the covariance of speech $\Phi_{SS}(l,k)$ in the audio signal $\overline{X}(l,k)$ (such as according to Equation 5). As described with reference to FIG. 2, the speech covariance $\Phi_{SS}(l,k)$ can be estimated when speech is present in the audio signal $\overline{X}(l,k)$ and the noise covariance $\Phi_{NN}(l,k)$ can be estimated when speech is absent from the audio signal $\overline{X}(l,k)$. In some implementations, the RTF estimation component 630 may use a VAD to determine whether speech is present or absent in the audio signal $\overline{X}(l,k)$ (such as the VAD 410 of FIG. 4). However, the RTF estimation component 630 may not be able to accurately estimate the speech covariance $\Phi_{SS}(l,k)$ when the SNR of the audio signal $\overline{X}(l,k)$ is too low.

In some aspects, the RTF estimation component 630 may selectively update the RTFs 602 based on a narrowband low SNR detection flag ($D_{nb}(l,k)$). As described with reference to FIGS. 3 and 4, the detection flag $D_{nb}(l,k)$ indicates whether a narrowband SNR of the reference audio signal $X_1(l,k)$ is below a threshold narrowband SNR level. With reference for example to FIG. 3, the detection flag $D_{nb}(l,k)$ may be included in, or otherwise indicated by, the low SNR signal 302. In some implementations, the RTF estimation component 630 may update the RTFs 602 only when the SNR of the audio signal $\overline{X}(l,k)$ is sufficiently high. For example, the RTF estimation component 630 may provide the estimated RTF vector $\hat{a}(l,k)$ to the MVDR beamforming component 620 (as the vector of RTFs 602) when the detection flag $D_{nb}(l,k)$ indicates that a low SNR condition is not detected ($D_{nb}(l,k)=0$).

By contrast, the RTF estimation component 630 may pause or otherwise refrain from updating the RTFs 602 when the SNR of the audio signal $\overline{X}(l,k)$ is too low. In some implementations, the RTF estimation component 630 may provide a predetermined RTF vector ($\hat{a}^*(l,k)$) to the MVDR beamforming component 620 (as the vector of RTFs 602) when the detection flag $D_{nb}(l,k)$ indicates that a low SNR condition is detected ($D_{nb}(l,k)=1$). Unlike the RTF vector $\hat{a}(l,k)$, which is estimated in real-time based on the audio signal $\overline{X}(l,k)$, the predetermined RTF vector $\hat{a}^*(l,k)$ does not depend on the current audio signal $\overline{X}(l,k)$. For example, the predetermined RTF vector $\hat{a}^*(l,k)$ may be stored by the RTF estimation component 630 (such as in an RTF store 632). The predetermined RTF vector $\hat{a}^*(l,k)$ may be any RTF vector known to result in a relatively accurate beam direction. In some aspects, the predetermined RTF vector $\hat{a}^*(l,k)$ may be the last RTF vector $\hat{a}(l,k)$ estimated by the RTF estimation component 630 before pausing updates to the RTFs 602.

In some other aspects (such as when an estimated RTF vector $\hat{a}(l,k)$ is not yet available), the predetermined RTF vector $\hat{a}^*(l,k)$ may be configured based on a geometry of the microphone array or the user's head. With reference for example to FIG. 1, the headset 110 is designed to be worn in substantially the same position on any user's head. As such, aspects of the present disclosure recognize that the relative positions of the microphones 112 and 114 with respect to the mouth of the user 120 may vary by little (if at all) over time and may be substantially the same for different users. Thus, in some implementations, the predetermined RTF vector $\hat{a}^*(l,k)$ may be estimated by testing the headset 110 on multiple users with different head shapes and sizes (including males and females) to account for RTF variations. In some other implementations, the predetermined RTF vector $\hat{a}^*(l,k)$ may be estimated and stored for a particular user of the headset 110 via an initial calibration process.

As a result, when the SNR of the audio signal $\overline{X}(l,k)$ is sufficiently high (such as when the detection flag $D_{nb}(l,k)$ indicates that the low SNR condition is detected), the MVDR beamforming component 620 may determine the MVDR beamforming filter $w_{MVDR}(l,k)$ based on the estimated RTF vector $\hat{a}(l,k)$. By contrast, when the SNR of the audio signal $\overline{X}(l,k)$ is too low (such as when the detection flag $D_{nb}(l,k)$ indicates that the low SNR condition is not detected), the MVDR beamforming component 620 may determine the MVDR beamforming filter $w_{MVDR}(l,k)$ based on the predetermined RTF vector $\hat{a}^*(l,k)$. Accordingly, the MVDR beamforming filter $w_{MVDR}(l,k)$ may be expressed as a function of the detection flag $D_{nb}(l,k)$:

$$w_{MVDR}(l,k) = \begin{cases} \sqrt{\dfrac{\hat{a}^H(l,k)\hat{a}(l,k)}{M}}\dfrac{\Phi_{NN}^{-1}(l,k)\hat{a}(l,k)}{\hat{a}^H(l,k)\Phi_{NN}^{-1}(l,k)\hat{a}(l,k)} & \text{if } D_{nb}(l,k)=0 \\ \sqrt{\dfrac{\hat{a}^{*H}(l,k)\hat{a}^*(l,k)}{M}}\dfrac{\Phi_{NN}^{-1}(l,k)\hat{a}^*(l,k)}{\hat{a}^{*H}(l,k)\Phi_{NN}^{-1}(l,k)\hat{a}^*(l,k)} & \text{if } D_{nb}(l,k)=1 \end{cases}$$

As described with reference to FIG. 2, the RTF vector $\hat{a}^*(l,k)$ can be estimated based on the covariance of speech $\Phi_{SS}(l,k)$ in the audio signal $\overline{X}(l,k)$. Thus, using Equation 4, the MVDR beamforming filter $w_{MVDR}(l,k)$ can be rewritten as a function of the speech covariance $\Phi_{SS}(l,k)$ and the one-hot vector ($u(l,k)$) representing the reference microphone channel:

$$w_{MVDR}(l,k) = \begin{cases} \dfrac{\Phi_{NN}^{-1}(l,k)\Phi_{SS}(l,k)}{\mathrm{trace}\left(\Phi_{NN}^{-1}(l,k)\Phi_{SS}(l,k)\right)}u(l,k) & \text{if } D_{nb}(l,k)=0 \\ \sqrt{\dfrac{\hat{a}^{*H}(l,k)\hat{a}^*(l,k)}{M}}\dfrac{\Phi_{NN}^{-1}(l,k)\hat{a}^*(l,k)}{\hat{a}^{*H}(l,k)\Phi_{NN}^{-1}(l,k)\hat{a}^*(l,k)} & \text{if } D_{nb}(l,k)=1 \end{cases}$$

Figure 7:
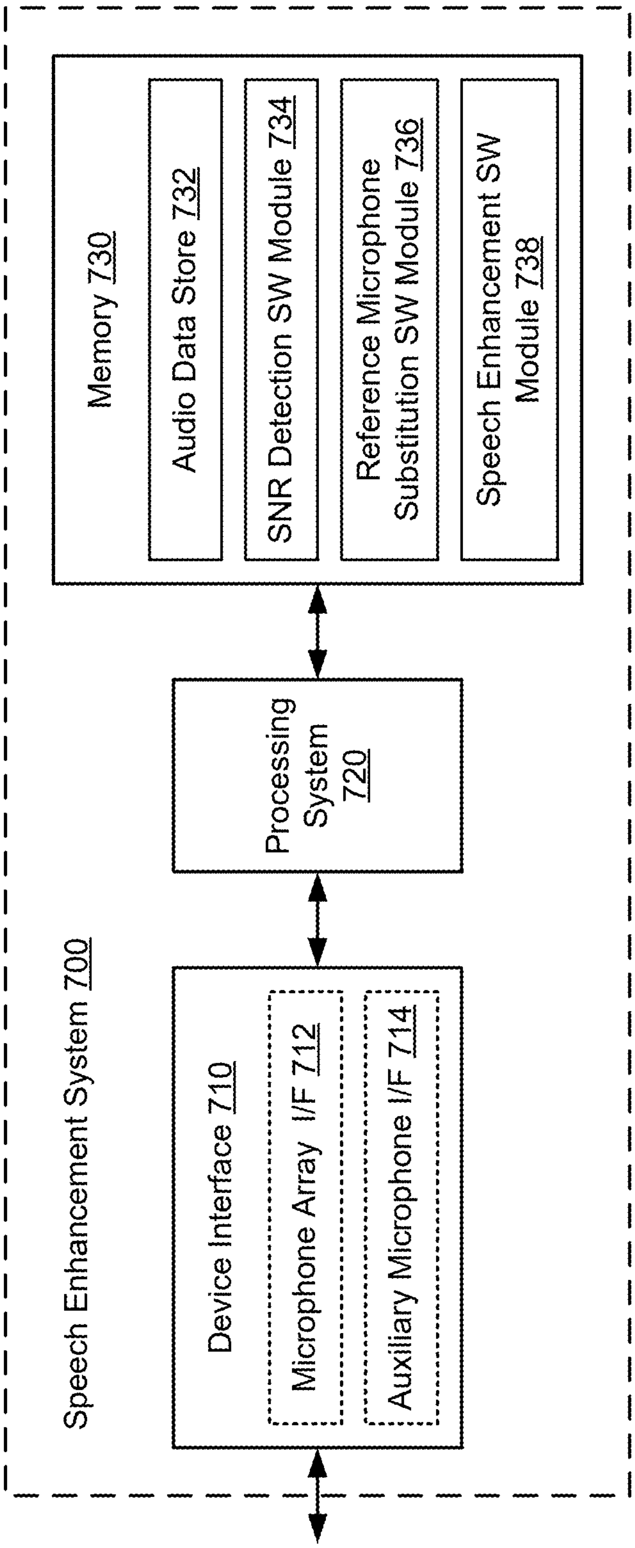
FIG. 7 shows another block diagram of an example speech enhancement system, according to some implementations.

FIG. 7 shows another block diagram of an example speech enhancement system 700, according to some implementations. The speech enhancement system 700 is configured to enhance a speech component of a multi-channel audio signal based, at least in part, on an auxiliary audio signal. The multi-channel audio signal may be received via a microphone array and the auxiliary audio signal may be received via an auxiliary microphone separate from the microphone array. In some implementations, the microphone array may be one example of the microphones 112 and 114 of FIG. 1 or the microphones 210(1)-210(M) of FIG. 2 AND the auxiliary microphone may be one example of the auxiliary microphone 116 of FIG. 1.

The speech enhancement system 700 includes a device interface 710, a processing system 720, and a memory 730. The device interface 710 is configured to communicate with one or more components of an audio receiver (such as the headset 110 of FIG. 1). In some implementations, the device interface 710 may include a microphone array interface (I/F) 712 configured to communicate with the microphone array and an auxiliary microphone interface (I/F) 714 configured to communicate with the auxiliary microphone. The microphone array interface 712 may receive a plurality of audio signals via a plurality of microphones, respectively, of the microphone array, where each audio signal of the plurality of audio signals represents a respective channel of the multi-channel audio signal. The auxiliary microphone interface 714 may receive the auxiliary audio signal via the auxiliary microphone.

The memory 730 may include an audio data store 732 configured to store frames of the multi-channel audio signal and the auxiliary audio signal as well as any intermediate signals that may be produced by the speech enhancement system 700 as a result of speech enhancement. The memory 730 also may include a non-transitory computer-readable medium (including one or more nonvolatile memory elements, such as EPROM, EEPROM, Flash memory, or a hard drive, among other examples) that may store at least the following software (SW) modules:

- an SNR detection SW module 734 to detect a wideband SNR of a reference audio signal of the plurality of audio signals;
- a reference microphone substitution SW module 736 to selectively substitute at least part of the reference audio signal for the auxiliary audio signal based on the wideband SNR so that the multi-channel audio signal includes the auxiliary audio signal, in lieu of the at least part of the reference audio signal, as a result of the substitution; and
- a speech enhancement SW module 738 to enhance a speech component of the multi-channel audio signal based on an MVDR beamforming filter.

Each software module includes instructions that, when executed by the processing system 720, causes the speech enhancement system 700 to perform the corresponding functions.

The processing system 720 may include any suitable one or more processors capable of executing scripts or instructions of one or more software programs stored in the speech enhancement system 700 (such as in the memory 730). For example, the processing system 720 may execute the SNR detection SW module 734 to detect a wideband SNR of a reference audio signal of the plurality of audio signals. The processing system 720 also may execute the reference microphone substitution SW module 736 to selectively substitute at least part of the reference audio signal for the auxiliary audio signal based on the wideband SNR so that the multi-channel audio signal includes the auxiliary audio signal, in lieu of the at least part of the reference audio signal, as a result of the substitution. Further, the processing system 720 may execute the speech enhancement SW module 738 to enhance a speech component of the multi-channel audio signal based on an MVDR beamforming filter.

Figure 8:
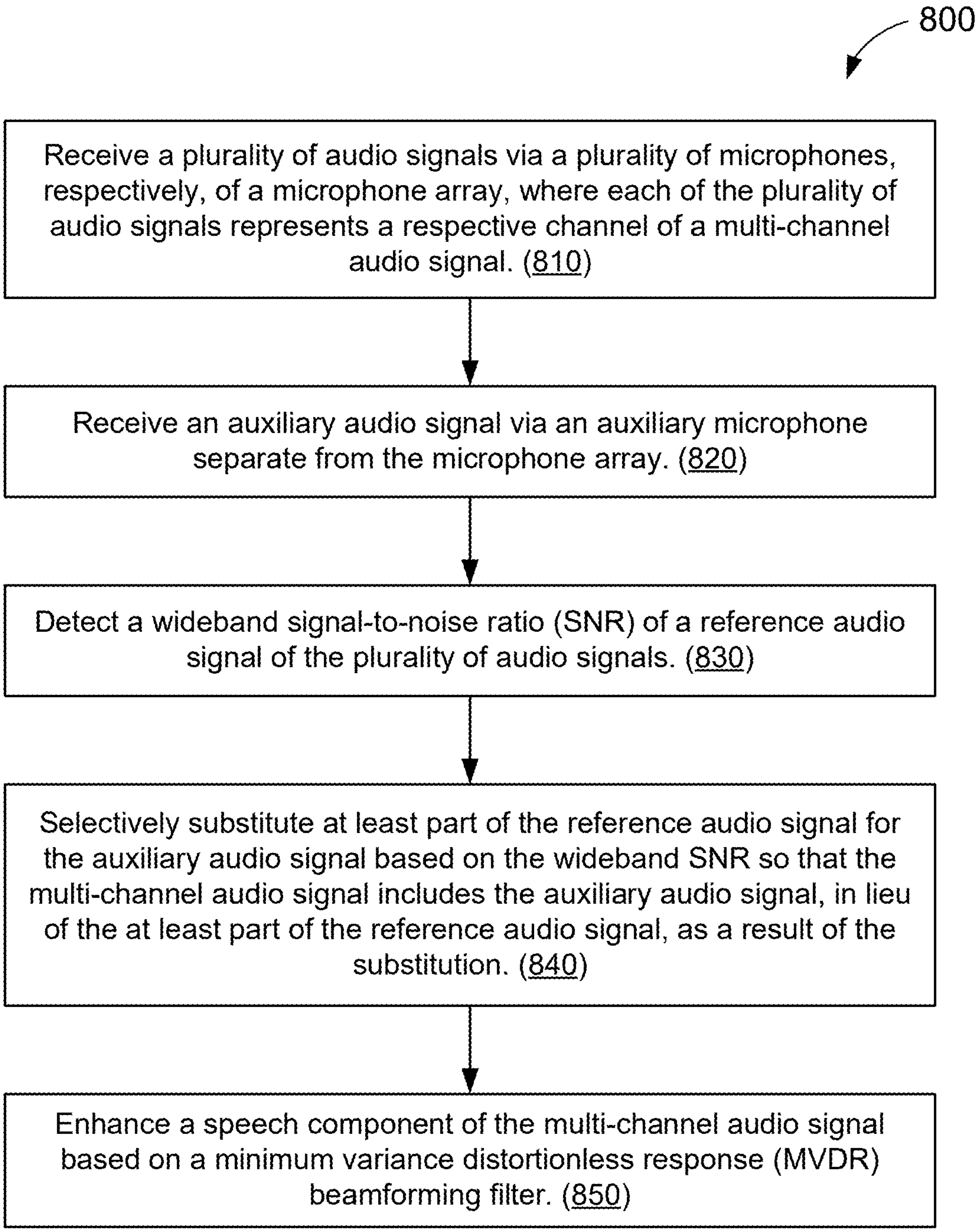
FIG. 8 shows an illustrative flowchart depicting an example operation for speech enhancement, according to some implementations.

FIG. 8 shows an illustrative flowchart depicting an example operation 800 for speech enhancement, according to some implementations. In some implementations, the example operation 800 may be performed by a speech enhancement system such as the speech enhancement system 300 of FIG. 3 or the speech enhancement system 700 of FIG. 7.

The speech enhancement system receives a plurality of audio signals via a plurality of microphones, respectively, of a microphone array, where each of the plurality of audio signals represents a respective channel of a multi-channel audio signal (810). The speech enhancement system also receives an auxiliary audio signal via an auxiliary microphone separate from the microphone array (820). In some aspects, the microphone array may be disposed on an outer surface of a housing worn by a user and the auxiliary microphone may be disposed on an inner surface of the housing that is closer to the user than the outer surface. In some implementations, the auxiliary microphone may be a bone conduction microphone. In some other implementations, the auxiliary microphone may be a feedback microphone associated with an ANC system.

The speech enhancement system detects a wideband signal-to-noise ratio (SNR) of a reference audio signal of the plurality of audio signals (830). In some implementations, the wideband SNR may be detected based on a noise floor of the reference audio signal. The speech enhancement system selectively substitutes at least part of the reference audio signal for the auxiliary audio signal based on the wideband SNR so that the multi-channel audio signal includes the auxiliary audio signal, in lieu of the at least part of the reference audio signal, as a result of the substitution (840). The speech enhancement system further enhances a speech component of the multi-channel audio signal based on an MVDR beamforming filter (850).

In some aspects, the speech enhancement system may determine whether the wideband SNR is below a threshold level and substitute the at least part of the reference audio signal for the auxiliary audio signal responsive to determining that the wideband SNR is below the threshold level. In some implementations, each of the plurality of audio signals may be associated with a first range of frequencies and the auxiliary audio signal may be associated with a second range of frequencies narrower than the first range. In such implementations, the part of the reference audio signal that is substituted for the auxiliary audio signal may include any frequency components of the reference audio signal that overlap the second range of frequencies.

In some aspects, the speech enhancement system may determine a plurality of RTFs based on the multi-channel audio signal, determine the MVDR beamforming filter based at least in part on the plurality of RTFs, detect a narrowband SNR of the reference audio signal, determine whether the narrowband SNR is below a threshold level, and selectively update the plurality of RTFs based on whether the narrowband SNR is below the threshold level. In some implementations, the speech enhancement system may refrain from updating the plurality of RTFs responsive to determining that the narrowband SNR is below the threshold level. In some other implementations, the speech enhancement system may dynamically update the plurality of RTFs responsive to determining that the narrowband SNR is not below the threshold level.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method of speech enhancement, comprising:

receiving a plurality of audio signals via a plurality of microphones, respectively, of a microphone array, each of the plurality of audio signals representing a respective channel of a multi-channel audio signal;

receiving an auxiliary audio signal via an auxiliary microphone separate from the microphone array;

detecting a wideband signal-to-noise ratio (SNR) of a reference audio signal representing any one of the plurality of audio signals, the wideband SNR representing a total SNR of the reference audio signal measured across a plurality of frequency bins;

determining whether the wideband SNR is below a threshold level;

substituting at least part of the reference audio signal for the auxiliary audio signal responsive to the determining that the wideband SNR is below the threshold level so that the multi-channel audio signal includes the auxiliary audio signal, in lieu of the at least part of the reference audio signal, as a result of the substitution; and enhancing a speech component of the multi-channel audio signal based on a minimum variance distortionless response (MVDR) beamforming filter.

2. The method of claim 1, wherein the microphone array is disposed on an outer surface of a housing worn by a user and the auxiliary microphone is disposed on an inner surface of the housing that is closer to the user than the outer surface.

3. The method of claim 1, wherein the auxiliary microphone comprises a bone conduction microphone.

4. The method of claim 1, wherein the auxiliary microphone comprises a feedback microphone associated with an active noise cancellation (ANC) system.

5. The method of claim 1, wherein the wideband SNR is detected based on a noise floor of the reference audio signal.

6. The method of claim 1, wherein each of the plurality of audio signals is associated with a first range of frequencies and the auxiliary audio signal is associated with a second range of frequencies narrower than the first range.

7. The method of claim 6, wherein the part of the reference audio signal that is substituted for the auxiliary audio signal includes any frequency components of the reference audio signal that overlap the second range of frequencies.

8. The method of claim 1, further comprising:

determining a plurality of relative transfer functions (RTFs) based on the multi-channel audio signal;

determining the MVDR beamforming filter based at least in part on the plurality of RTFs;

detecting a narrowband SNR of the reference audio signal, the narrowband SNR representing an SNR of the reference audio signal measured at a single frequency bin of the plurality of frequency bins;

determining whether the narrowband SNR is below a threshold level; and selectively updating the plurality of RTFs based on whether the narrowband SNR is below the threshold level.

9. The method of claim 8, wherein the selective updating of the plurality of RTFs comprises:

dynamically updating the plurality of RTFs responsive to determining that the narrowband SNR is not below the threshold level.

10. The method of claim 8, wherein the selective updating of the plurality of RTFs comprises:

refraining from updating the plurality of RTFs responsive to determining that the narrowband SNR is below the threshold level.

11. A speech enhancement system comprising:

a processing system; and a memory storing instructions that, when executed by the processing system, causes the speech enhancement system to:

receive a plurality of audio signals via a plurality of microphones, respectively, of a microphone array, each of the plurality of audio signals representing a respective channel of a multi-channel audio signal;

receive an auxiliary audio signal via an auxiliary microphone separate from the microphone array;

detect a wideband signal-to-noise ratio (SNR) of a reference audio signal representing any one of the plurality of audio signals, the wideband SNR representing a total SNR of the reference audio signal measured across a plurality of frequency bins;

determine whether the wideband SNR is below a threshold level;

substituting at least part of the reference audio signal for the auxiliary audio signal responsive to the determining that the wideband SNR is below the threshold level so that the multi-channel audio signal includes the auxiliary audio signal, in lieu of the at least part of the reference audio signal, as a result of the substitution; and enhance a speech component of the multi-channel audio signal based on a minimum variance distortionless response (MVDR) beamforming filter.

12. The speech enhancement system of claim 11, wherein the microphone array is disposed on an outer surface of a housing worn by a user and the auxiliary microphone is disposed on an inner surface of the housing that is closer to the user than the outer surface.

13. The speech enhancement system of claim 11, wherein the auxiliary microphone comprises a bone conduction microphone or a feedback microphone associated with an active noise cancellation (ANC) system.

14. The speech enhancement system of claim 11, wherein the wideband SNR is detected based on a noise floor of the reference audio signal.

15. The speech enhancement system of claim 11, wherein each of the plurality of audio signals is associated with a first range of frequencies and the auxiliary audio signal is associated with a second range of frequencies narrower than the first range, the part of the reference audio signal that is substituted for the auxiliary audio signal including any frequency components of the reference audio signal that overlap the second range of frequencies.

16. The speech enhancement system of claim 11, wherein execution of the instructions further causes the speech enhancement system to:

determine a plurality of relative transfer functions (RTFs) based on the multi-channel audio signal;

determine the MVDR beamforming filter based at least in part on the plurality of RTFs;

detect a narrowband SNR of the reference audio signal, the narrowband SNR representing an SNR of the reference audio signal measured at a single frequency bin of the plurality of frequency bins;

determine whether the narrowband SNR is below a threshold level; and selectively update the plurality of RTFs based on whether the narrowband SNR is below the threshold level.

17. The speech enhancement system of claim 16, wherein the selective updating of the plurality of RTFs comprises:

dynamically updating the plurality of RTFs responsive to determining that the narrowband SNR is not below the threshold level.

18. The speech enhancement system of claim 16, wherein the selective updating of the plurality of RTFs comprises:

refraining from updating the plurality of RTFs responsive to determining that the narrowband SNR is below the threshold level.

* * * * *